United States Patent [19]

Ohmori

[11] Patent Number: 5,220,474
[45] Date of Patent: Jun. 15, 1993

[54] DEMAGNETIZER FOR MAGNETIC HEADS OF FLOPPY DISC DRIVE

[75] Inventor: Shigeyuki Ohmori, Gotemba, Japan
[73] Assignee: Show Electric Co., Ltd., Taipei, Taiwan
[21] Appl. No.: 831,856
[22] Filed: Feb. 5, 1992
[51] Int. Cl.[5] ............................................. G11B 5/465
[52] U.S. Cl. ..................................................... 360/128
[58] Field of Search ........................................ 360/128

[56] References Cited
U.S. PATENT DOCUMENTS
4,378,582  3/1983  Maier et al. .......................... 360/128

Primary Examiner—Robert S. Tupper
Attorney, Agent, or Firm—Fish & Richardson

[57] ABSTRACT

A demagnetizer for magnetic heads of floppy disc drive is made up of a receiving case having a size and shape similar to those of a conventional floppy disc and of a demagnetizing member disposed at a position in the receiving case where the magnetic heads make contact with the receiving case. The magnetizing member may be mounted on a rotating disc disposed in the receiving case. The magnetism of the magnetized magnetic heads is successfully removed by such a deed that a simple action initiated by the floppy disc drive serves to actuate the magnetized magnetic heads and/or the demagnetizing member to move close together and apart from each other in an alternated way, thereby resulting in a demagnetization of the magnetized magnetic heads.

3 Claims, 3 Drawing Sheets

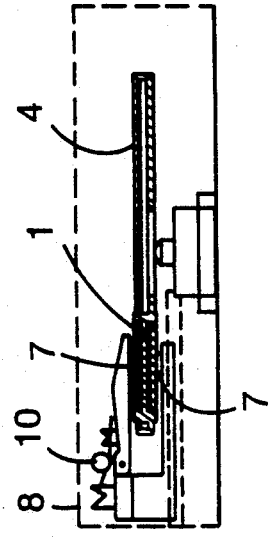
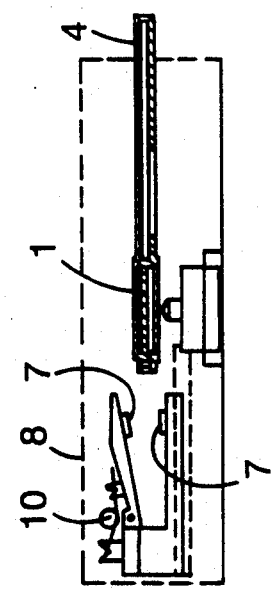
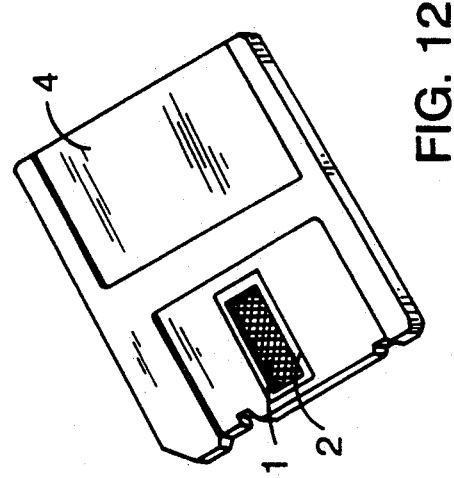
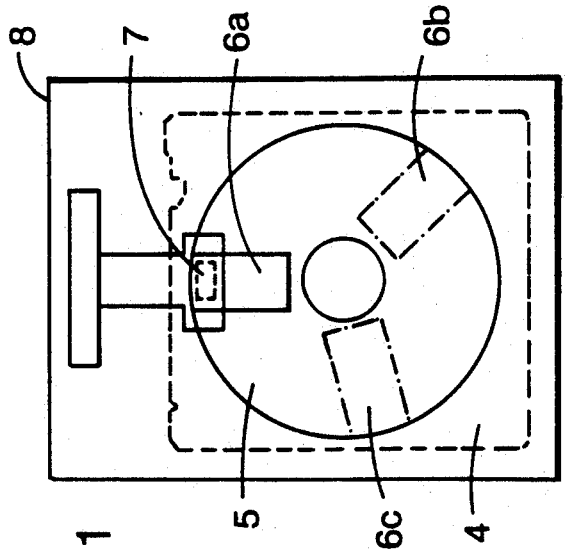

DEMAGNETIZER FOR MAGNETIC HEADS OF FLOPPY DISC DRIVE

BACKGROUND OF THE INVENTION

The present invention relates to a demagnetizer intended for use in removing magnetism of magnetic heads of floppy disc drive, which are used for recording and reproducing the execution signals on the floppy disc.

The floppy disc drive is an essential component of a computer, which has become an indispensable and ubiquitous equipment used extensively in offices, factories, schools, hospitals, stores, etc. The commonly-used recording medium of the computer is known as a floppy disc. The floppy disc is used as a device for recording external data made available to the computer and is provided therein with a magnetic recording disc capable of recording and storing the data, which may have a diameter of 8 inches, or 5¼ inches, or 3½ inches, or 2½ inches. The magnetic recording disc is protected by a receiving case.

The computer is equipped with a floppy disc drive having a pair of magnetic heads capable of recording and reproducing the signals and the data by means of making contact with the magnetic recording disc via a window disposed on both surfaces of the receiving case.

The magnetic recording layers of floppy disc have a plurality of tracks of concentric circle arranged in such a manner that they are spaced apart by an interval of 1/48 inch or 1/96 inch. As a result, the magnetic heads of the floppy disc drive must move on the tracks with precision so as to ensure that they read and write the date.

As mentioned previously, the floppy disc is composed of a magnetic recording disc having a thickness of 80 μm and capable of recording and reproducing data. The magnetic head of floppy disc drive executes the reading and the writing of the magnetic record on the surface of the magnetic recording disc. When such process is under way on a prolonged basis, the magnetic head is eventually magnetized in view of the fact that it makes contact with the surface of the magnetic recording disc. As a result, the efficiency of recording and reproducing the data stored in the tracks spaced in such a minute interval can be greatly undermined by the magnetic head which has been magnetized.

SUMMARY OF THE INVENTION

It is therefore the primary objective of the present invention to provide a magnetic head demagnetizer capable of eliminating with ease the magnetism of a magnetized magnetic head.

In keeping with the principles of the present invention, the primary objective of the present invention is accomplished by a magnetic head demagnetizer made up of a receiving case of floppy disc and of a demagnetizing member disposed at a position in the receiving case where the magnetic heads make contact with the receiving case. The magnetizing member may be mounted on a rotating disc disposed in the receiving case. The magnetism of the magnetized magnetic heads is successfully removed by a simple action initiated by the floppy disc drive, wherein said demagnetizing member and magnetized magnetic heads are both actuated to move close together and then away with each other, thereby resulting in a demagnetization of the magnetized magnetic heads.

The foregoing objective and features of the present invention will be better understood by studying the following detailed description of preferred embodiments of the present invention in conjunction with drawings provided herewith.

BRIEF DESCRIPTION OF THE DRAWINGS

FIG. 9 is a sectional view showing that a demagnetizer of the present invention is disposed in a floppy disc drive 8, with the demagnetizing member 1 of the demagnetizer remaining apart from the magnetic heads 7.

FIG. 10 shows that both magnetic heads 7 and demagnetizing member 1 as shown in FIG. 9 have moved close together.

FIG. 11 is a schematic view showing that a demagnetization of the magnetic head 7 by the demagnetizer disposed in the floppy disc drive as shown in FIG. 5 is under way.

FIG. 12 shows a three-dimensional schematic view of the demagnetizer as shown respectively in FIGS. 5 and 6.

DETAILED DESCRIPTION OF THE PREFERRED EMBODIMENTS

Figure 1:
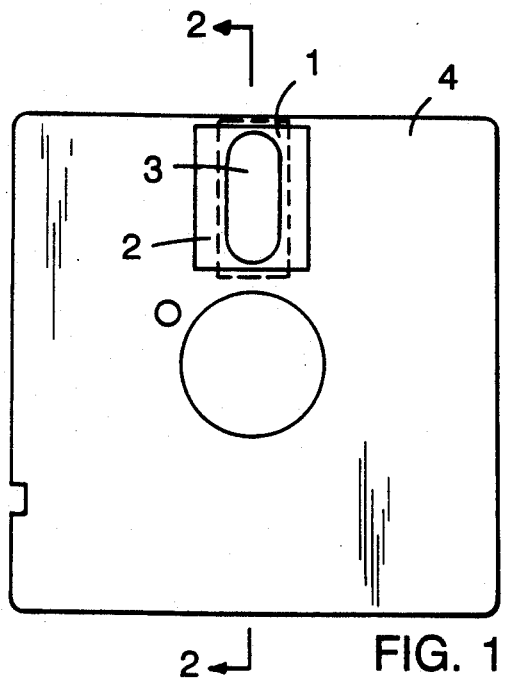
FIG. 1 shows a plan schematic view of a preferred embodiment of the present invention.
Figure 2:
FIG. 2 shows a sectional view of a demagnetizer embodied in the present invention as shown in FIG. 1.

Referring to FIGS. 1 and 2, a demagnetizer embodied in the present invention is shown comprising a magnet 1, which is used to make up a demagnetizing member and is disposed securely in place in a receiving case 4 of a conventional 5¼ inches floppy disc. The magnet 1 of the demagnetizing member is disposed fixedly in a window 3 of the receivng case 4, into which the magnetic heads of a floppy disc drive are inserted. The window 3 is protected by a shield 2 intended to prevent the dust from entering the receiving case 4 via the window 3. The shield 2 is made from plastic film and has a thickness less than 100 μm. The magnet 1 has a thickness on the order of 1.0 mm. The receiving case 4 described above is the same as that of a conventional floppy disc of prior art.

Figure 3:
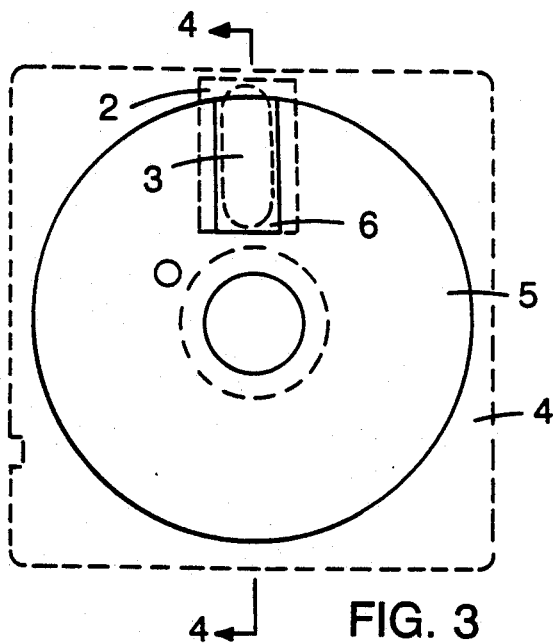
FIG. 3 shows a plan schematic view of another preferred embodiment of the present invention.
Figure 4:
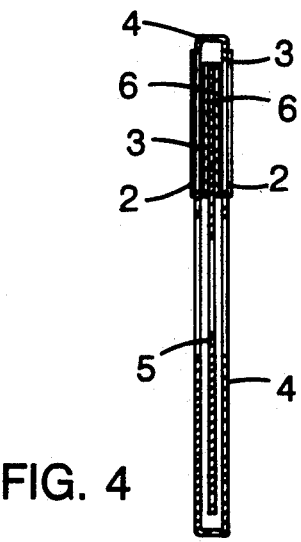
FIG. 4 shows a sectional view of a demagnetizer embodied in the present invention as shown in FIG. 3.

Now referring to FIGS. 3 and 4, a demagnetizer of another preferred embodiment of the present invention is shown comprising a demagnetizing member 6, which is mounted on a rotating disc 5 disposed in a receiving case 4 identical with that of a conventional floppy disc of prior art. The receiving case 4 is provided with a window 3 located at a place where it makes contact with magnetic heads. The demagnetizing member 6 is mounted on the rotating disc 5 so that they turn synchronously. It is important that the demagnetizing member 6 should have a thickness less than 200 μm so that it can be attached securely to the surface of the rotating disc 5 by means of adhesive agents or printing.

Figure 5:
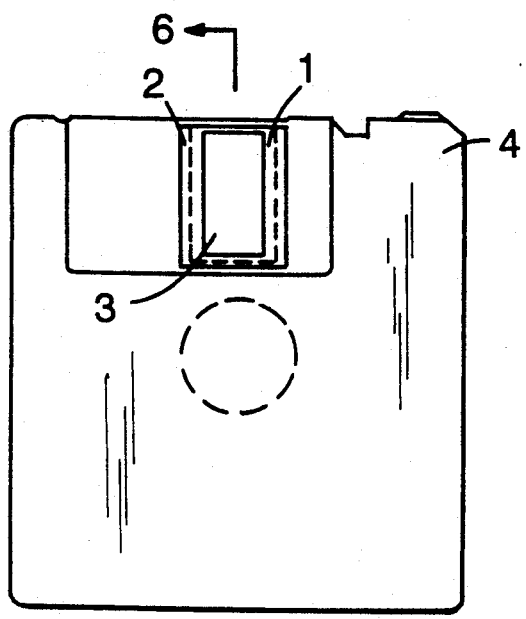
FIG. 5 shows a plan schematic view of still another preferred embodiment of the present invention.
Figure 6:
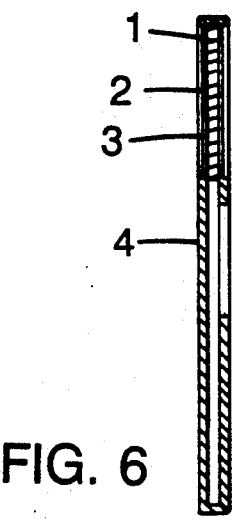
FIG. 6 shows a sectional view of a demagnetizer embodied in the present invention as shown in FIG. 5.

As shown in FIGS. 5 and 6, in conjunction with FIG. 12, another preferred embodiment of the present invention has a demagnetizing member comprising a magnet 1 attached fixedly to a convnetional 3½ inches floppy disc. In addition, the receiving case 4 is provided with a window 3 in which the magnet 1 of the demagnetizing member is disposed. The window 3 is shielded by a protective membrane 2 serving to prevent the dust from contaminating the interior of the receiving case 4. The protective membrane 2 has a thickness not greater than 100 μm and is made of plastic film.

Figure 7:
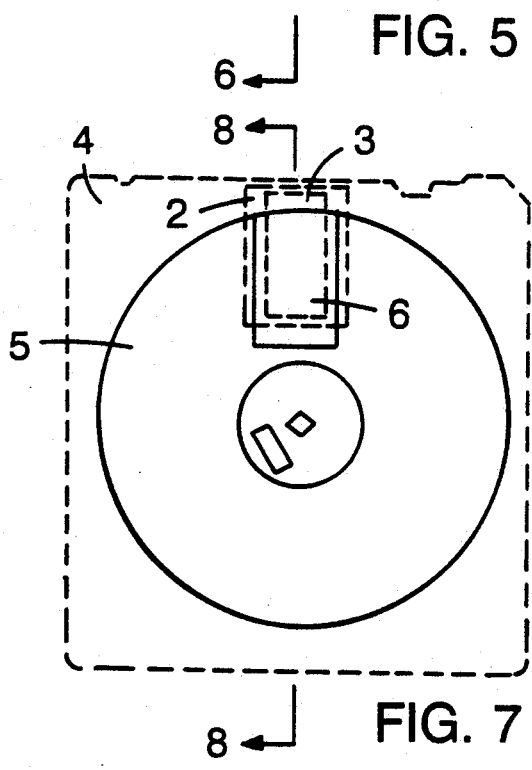
FIG. 7 shows a plan schematic view of still another preferred embodiment of the present invention.

The demagnetizer embodied in the present invention and shown in FIG. 7 is basically similar in structure to the one shown in FIGS. 3 and 4. The reference numerals used respectively in FIGS. 3, 4 and 7 are therefore exactly alike. The demagnetizing member 6 is attached to a rotating disc 5 disposed in the receiving case 4 of a conventional 3½ inches floppy disc.

The working principles of the demagnetizer embodied in the present invention are expounded explicitly hereinafter in conjunction with FIGS. 9-11.

As shown in FIG. 9, the demagnetizer shown respectively in FIGS. 5, 6 and 12 is inserted into a floppy disc drive 8 with its demagnetizing member 1 disposed in a receiving case 4 and remained apart from the magnetic heads 7 of a floppy disc drive 8. When the demagnetizer is pushed gradually into a read-write position in the floppy disc drive 8, a locking spring 10 of magnetic head located in the floppy disc drive 8 is actuated to press the magnetic heads 7 to remain close to the demagnetizing member 1, as shown in FIG. 10. Thereafter, when the receiving case 4 is withdrawn from the floppy disc drive 8, the demagnetizing member 1 is made accordingly to retreat from magnetic heads, as shown in FIG. 9. As a result of such forwarding and retreating actions of the demagnetizing member 1 as described above, the demagnetization process of the magnetized magnetic heads 7 is brought about.

Figure 8:
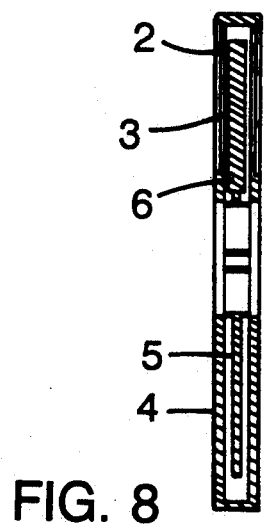
FIG. 8 shows a sectional view of a demagnetizer embodied in the present invention as shown in FIG. 7.

In a similar manner, another demagnetizer embodied in the present invention and shown in FIGS. 7 and 8 can be put to work to eliminate the magnetism of the magnetized magnetic heads 7 of the floppy disc drive 8 which is shown in FIGS. 9 and 10. The floppy disc drive 8 is actuated to drive the rotating disc 5 disposed in the receiving case 4 to turn. As a result, the demagnetizng member 6 mounted on the rotating disc 5 is in turn driven to rotate continuously from 6a to 6b and then to 6c as shown in FIG. 11. The process of demagnetizing the magnetized magnetic heads 7 is thus carried out by the demagnetizing member 6 rotating continuously so as to remain close to and apart from the magnetized magnetic heads 7 in an alternate manner.

It is therefore apparent that an effective demagnetization of the magnetized magnetic heads of floppy disc drive can be brought about easily by means of the demagnetizer of the present invention, which is mounted in the receiving case of a conventional floppy disc of prior art. The demagnetizer embodied in the present invention is therefore capable of improving the efficiency and the accuracy of recording and reproducing the signals and the data of the floppy disc system.

What is claimed is:

1. A demagnitizer for magnetic heads of a floppy disc drive comprising:
   a receiving case having a size and a shape substantially that of a conventional floppy disc; and
   a permanent magnet demagnetizing member fixedly mounted in said receiving case at a position where reading and writing of data on said conventional floppy disc by said magnetic heads of said floppy disc drive take place.

2. The demagnitizer of claim 1 wherein said demagnitizer is fixedly mounted in the read-write window of said case of said floppy disc assembly.

3. A demagnitizer for magnetic heads of a floppy disc drive comprising:
   a conventional floppy disc assembly comprising a case and a disc mounted for rotation therein; and
   a demagnetizing member mounted on said rotatable disc at a position where reading and writing of data on said conventional floppy disc by the magnetic heads of said floppy disc drive take place.

* * * * *